United States Patent [19]

Stickle et al.

[11] Patent Number: 4,530,275
[45] Date of Patent: Jul. 23, 1985

[54] TACO BOAT FRYER

[75] Inventors: John S. Stickle, Carollton, Tex.; Louis F. Sabatasso, 20 Burning Tree, Newport Beach, Calif. 92660

[73] Assignee: Louis Sabatasso, Newport Beach, Calif.

[21] Appl. No.: 594,837

[22] Filed: Mar. 29, 1984

[51] Int. Cl.³ .............................................. A47J 37/12
[52] U.S. Cl. ........................................ 99/353; 99/404; 99/430; 99/432; 99/439; 425/292; 425/412; 426/138; 426/439; 426/502
[58] Field of Search ................. 99/428, 430, 432, 433, 99/439, 450, 448, 443 C, 403, 404, 407, 426, 427, 352, 353, 373, 383, 384; 426/438, 439, 138, 502; 425/289, 292, 302.1, 306, 316, 383, 406, 412, 293

[56] References Cited

U.S. PATENT DOCUMENTS

| 1,470,521 | 10/1923 | Combest | 99/450 |
| 1,596,652 | 8/1926 | Giovannetti | 99/403 X |
| 2,232,633 | 2/1941 | Richardson | 425/293 |
| 2,570,374 | 10/1951 | Pompa | 99/426 X |
| 2,907,268 | 10/1959 | Doolin | 99/404 X |
| 3,602,130 | 8/1971 | Perez | 99/404 |
| 3,653,337 | 4/1972 | Hanson | 99/404 X |
| 3,785,273 | 1/1974 | Stickle | 99/427 |
| 3,948,160 | 4/1976 | Stickle | 99/404 |
| 4,091,720 | 5/1978 | Wheeler | 99/430 X |
| 4,173,926 | 11/1979 | Brignall | 99/403 X |

Primary Examiner—Billy J. Wilhite
Attorney, Agent, or Firm—Christie, Parker & Hale

[57] ABSTRACT

A taco boat fryer in which foldable product carrier sections are linked together and pushed sequentially through a vat containing hot cooking oil. Each product carrier has a pair of hinged plates that are pushed together as the carrier section enters the vat at one end and are pulled apart as the carrier section leaves the vat at the other end. Mating male and female porous mold sections mounted on the respective plates receive a tortilla before the plates are pushed together, the mold sections shaping the tortilla during the movement of the carrier section through the cooking oil.

10 Claims, 6 Drawing Figures

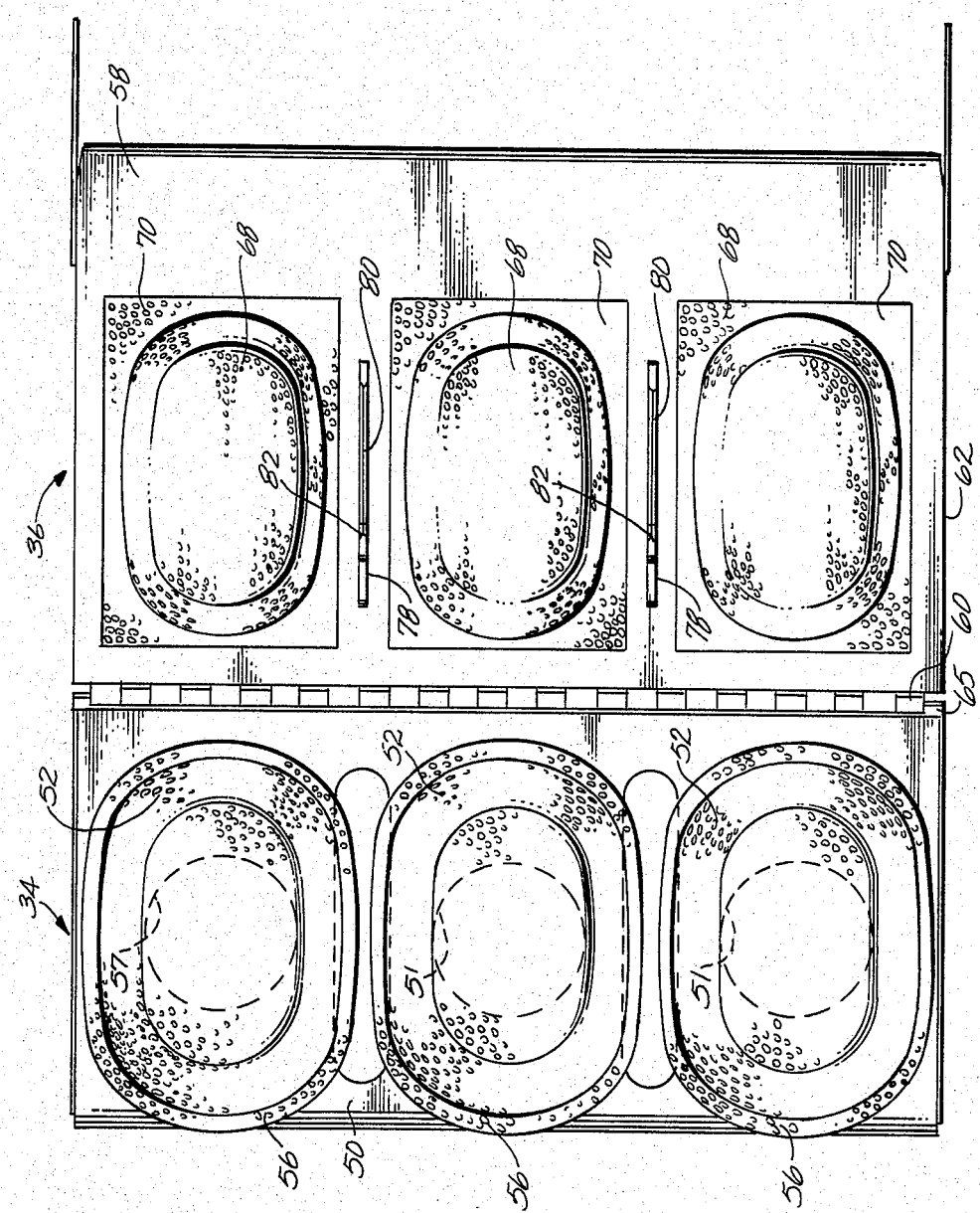

TACO BOAT FRYER

FIELD OF THE INVENTION

This invention relates to tortilla fryers and, more particularly, to apparatus for molding and frying taco boats.

BACKGROUND OF THE INVENTION

In U.S. Pat. No. 3,785,273 there is described apparatus for a machine for forming tortillas into a conventional U-shaped taco shell and then frying the tortillas to make the taco shells crisp so that they hold their shapes. Taco shells are used for making a popular Mexican taco by stuffing the shell with meat, beans, lettuce, tomato, cheese and other ingredients. However, the conventional taco shell, being open at the ends, cannot hold very much without the ingredients spilling out the ends and becoming messy to eat.

SUMMARY OF THE INVENTION

The present invention is directed to apparatus for frying tortillas in the form of taco boats. When fried, the taco boat forms an edible container in which the ingredients of a taco or tostada can be held and eaten. Because of its shape, the taco boat is more effective in holding the ingredients and provides a bigger volume. It is easier to serve and eat, making it ideal for school lunches and fast food restaurants.

In brief, the present invention provides apparatus for continuously molding and frying taco boats.

This is achieved by providing cooking apparatus of the type in which a plurality of foldable product carrier sections are linked together at opposite margins to form a continuous closed loop, the carrier sections being collapsible from a substantially open condition to a closed condition by moving the margins of the sections together in accordian fasion. Each product carrier section includes first and second rigid frames having openings through which hot cooking fat can flow. The two frames of each carrier section are hinged together, allowing each carrier section to open and close. A plurality of porous, male mold members are secured to one frame, and a plurality of mating, porous, female mold members are secured to the other frame, the male mold members moving into the female mold members when the hinged frames are moved together. Each carrier section is closed in sequence by pushing the rearmost frame member toward the other frame member of the carrier section after a specially shaped tortilla is placed between the open molds. As each successive carrier section is pushed closed, it pushes the other closed carrier sections ahead of it through the hot cooking oil to fry the taco boats. The carrier sections are then pulled one by one out of the cooking fat and opened, allowing the taco boats to be removed from the molds.

DESCRIPTION OF THE DRAWINGS

For a better understanding of the invention, reference should be made to the accompanying drawings, wherein:

FIG. 6 is a plan view of the male and female mold sections.

DETAILED DESCRIPTION

Figure 1:
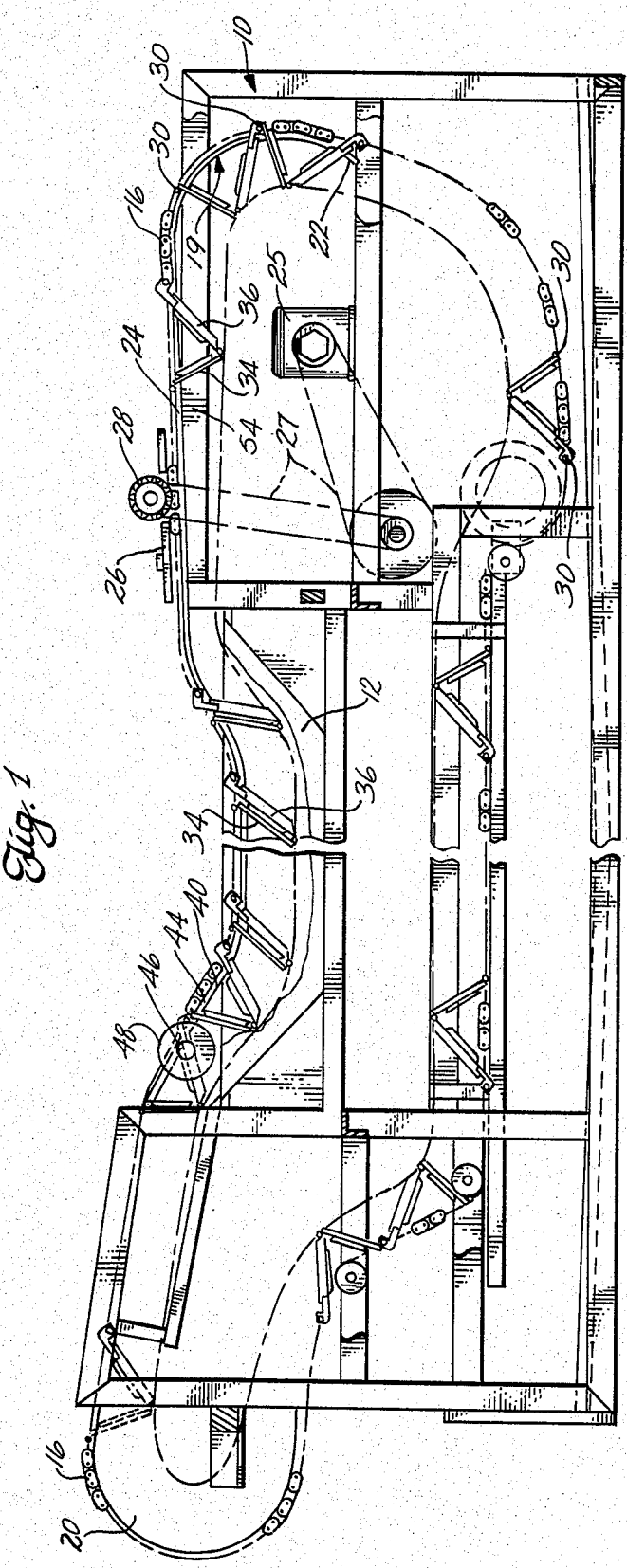
FIG. 1 is a side elevational view, partly cut away, of the preferred embodiment.
Figure 2:
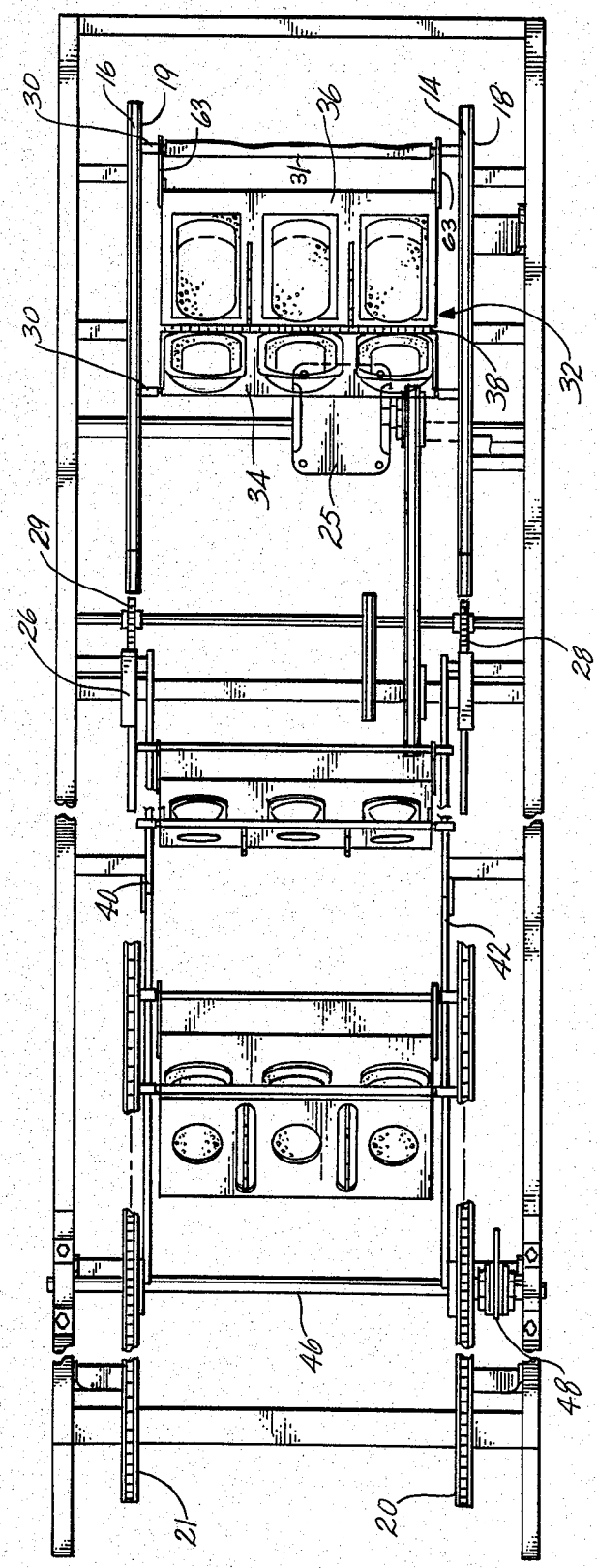
FIG. 2 is a top view, partially cut away, of the same embodiment.
Figure 3:
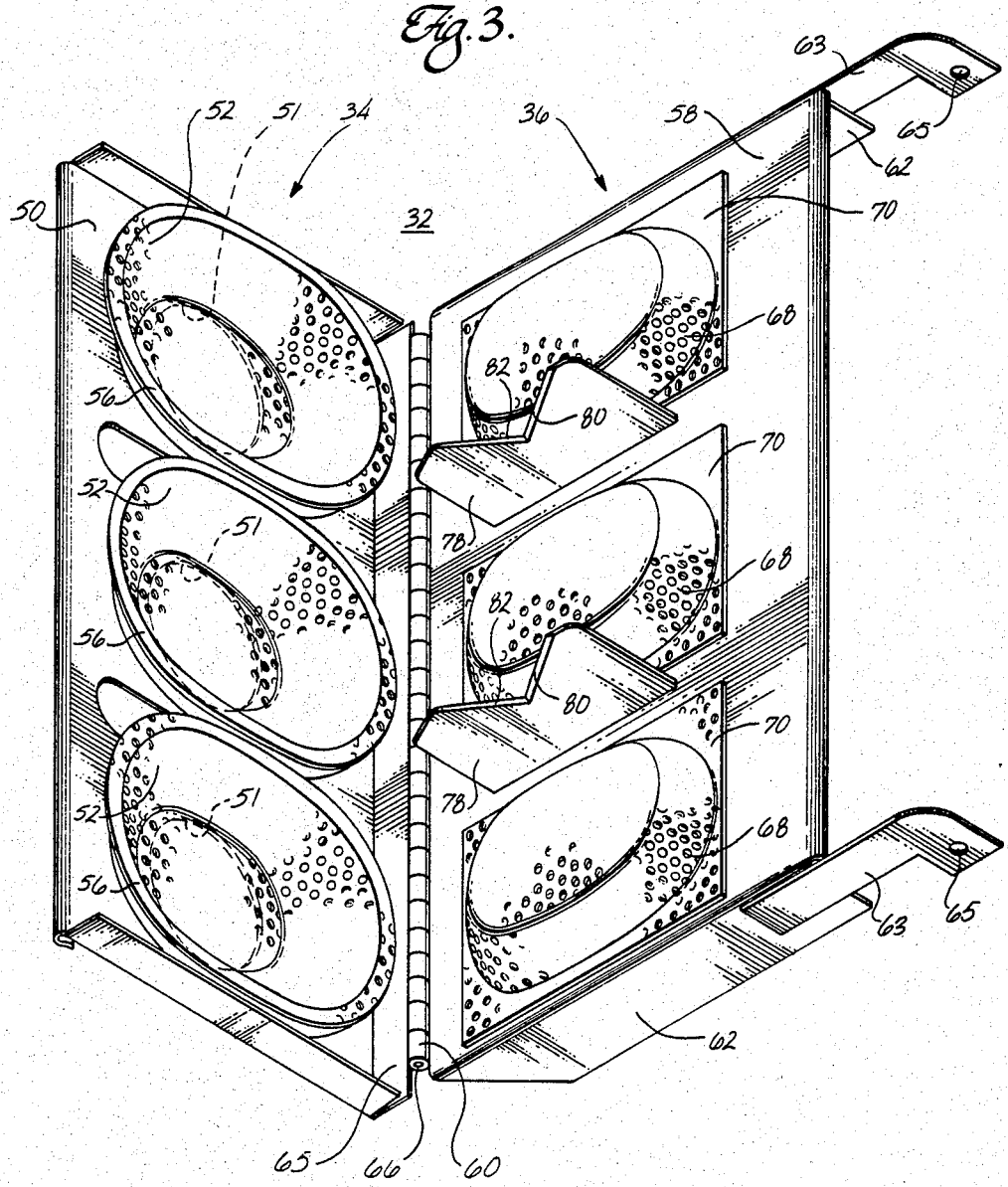
FIG. 3 is a perspective view of one of the product carrier molding sections.

The taco boat fryer of the present invention utilizes a frying machine similar in design to the machine described in U.S. Pat. No. 3,948,160, which is incorporated by reference. The machine consists of a main frame, indicated generally at 10, on which is supported an open trough 12 which contains the heated cooking fat or oil in which the tortillas are fried. A pair of parallel endless chains 14 and 16 are movably supported on the frame by a pair of tracks 18 and 19 at the input end of the machine and by tracks 20 and 21 at the output end. The tracks 18 and 19 have a substantially arcuate section 22 terminating in a straight inclined section 24. A sprocket drive 28, 29 engages the chains as they move along the straight sections 24, pulling the conveyor chains around the arcuate sections 22 and pushing the chains off the end of the straight section 24. Separate guide sections 26 are positioned above each of the chains along the straight sections of the tracks to keep the chains from buckling as they are pushed toward the ends of the straight sections 24 by the sprocket drive. The sprocket drive includes a suitable motor 25 and connecting chain drive 27.

Extending laterally between the two conveyor chains at spaced distances are a plurality of carrier rods 30. The carrier rods support foldable product carrier sections, indicated generally at 32. Each product carrier section 32, as hereinafter described in more detail, has two frame members 34 and 36 which are hinged together along an axis 38 extending parallel to the rods 30. The two hinged frame sections of each carrier section are supported by and between adjacent pairs of rods 30. With the chains 14 and 16 stretched out so that the rods 30 are fully separated, the product carrier section between two rods forms an open V-shaped cavity for receiving the unfried tortillas. As the rods are moved past the sprocket drive 28, they are pushed beyond the ends of the straight sections 24 of the tracks 18 and 19, at which point, because the chains are under compression by the pushing action of the sprocket drives, the conveyor chains 14 and 16 buckle and sag, causing adjacent rods 30 to move together and collapsing the associated carrier sections. As the rods merge from the end of the straight sections 24, they are supported on a pair of guide rails 40 and 42. These rails support the now closed product carrier sections and guide the carrier sections through the cooking fat in the trough 12.

After being pushed through the cooking trough 12, the food carrier sections and associated rods 30 move up an incline 44 out of the cooking oil. Pulling the sections up the incline moves them out of the trough and causes the sections to open. The chains 14 and 16 pass over a second sprocket drive 46 which is connected to a drag brake 48. Beyond the sprocket 46 and drag brake 48, the chains 14 and 16 are put in tension as the chains are pulled through the rest of the closed loop by the chain drive system. With the chains again put in tension, the rods 30 move apart to their maximum separation, opening the associated food carrying sections fully and allowing the fried food product to be removed from the carrier sections before they pass under the trough 12 back to the input end of the machine.

Referring to FIGS. 3–6, the construction of the individual food carrier sections 32 for molding the taco boats is shown in detail. Each carrier section 32 includes two frame members 34 and 36. The frame member 34 includes a flat metal plate 50 having three laterally spaced openings 51. The outer edge 31 is formed in a tubular shape to receive a supporting rod 30. Three margins of the plate are preferably formed with a lip to stiffen the plate. Three female mold sections 52 are secured to the plate respectively over each of the openings. Each female mold section 52 is made of a perforated metal screen formed in the shape of a slightly elongated dish with a lip formed around the margin, as indicated at 56. The perforated screen of the mold allows the cooking oil to flow freely through the mold and associated opening 51 in the plate 50.

The frame member 36 is similarly formed of a flat plate 58 provided with three openings 60. The plate is formed with upturned margins, as indicated at 62, for stiffening the plate. A hinge 64 attached to one edge of the plate 58 and the turned up edge 65 of the plate 50 provides a pivot axis 66 which is offset from the plane of the plate 50 by a distance slightly greater than the depth of the female molds 52. Brackets 63 secured to the margins 62 extend outwardly and are provided with holes 65 for receiving a supporting rod 30. A plurality of male mold members 68 are each formed of a perforated metal screen shaped as a slightly elongated inverted dish and are secured to the plate 58 over the openings 60. The male mold members have a flat lip 70 around the margins which lies against the plate 58. When the two hinged frame members are brought together, the plates are substantially parallel to each other and the male mold members 68 are positioned inside the female mold members.

Figure 4:
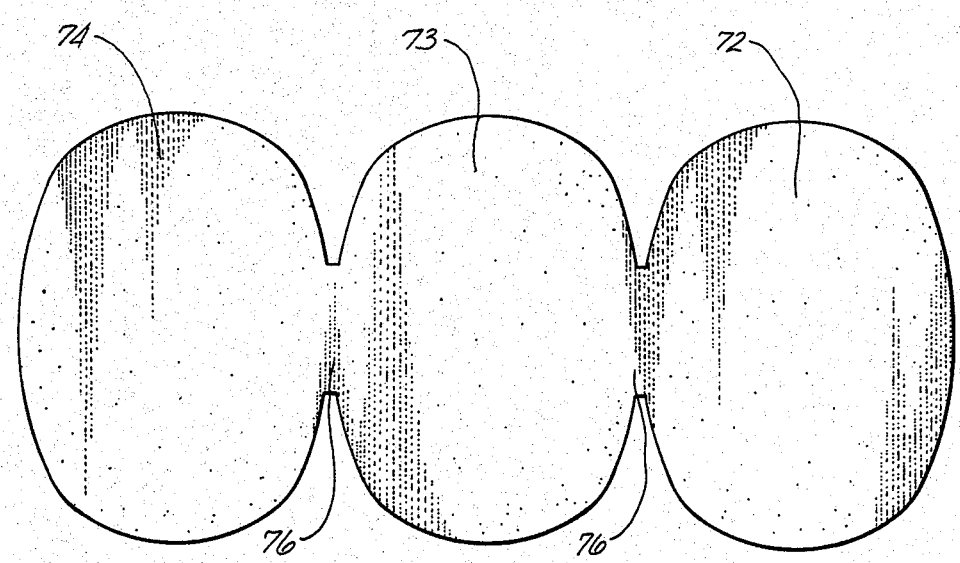
FIG. 4 is a plan view of the corn or tortilla product as it is fed into the taco boat fryer.
Figure 5:
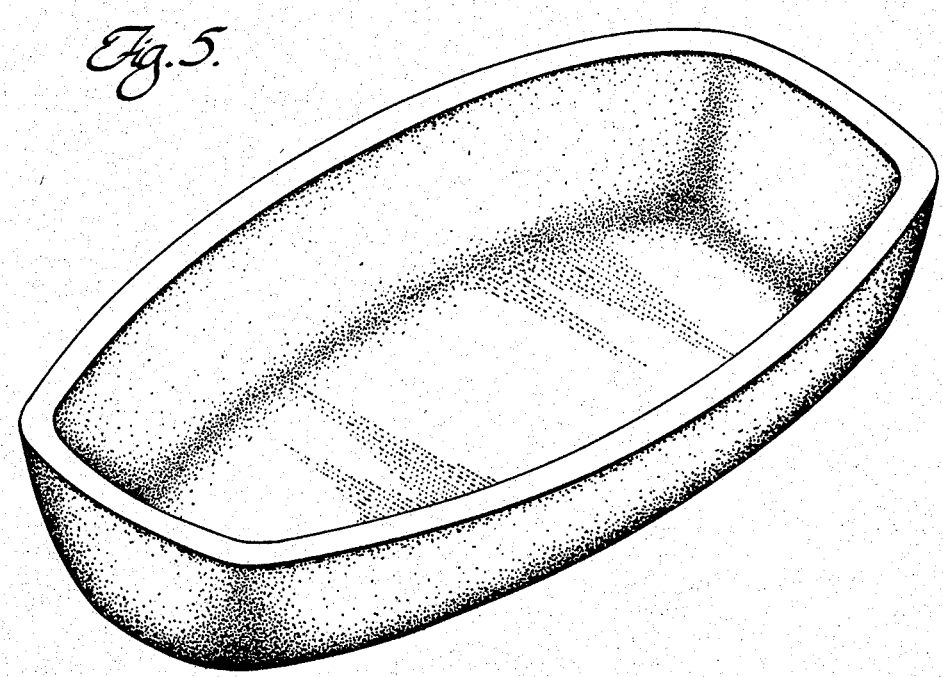
FIG. 5 is a perspective view of the molded and fried taco boat.

Referring to FIG. 4, the tortilla or corn dough product is first baked in the shape shown, in which three boat sections 72, 73 and 74 are held together by connecting tabs 76. This specially shaped tortilla as it comes from the oven is thin and flexible. One of these specially shaped tortillas is inserted in each open food carrier section 32. When inserted, the three sections of the tortilla are positioned over the top of the three male mold members 68 and are held in proper position by a pair of stop members 78 positioned on either side of the center mold. The stop members include a knife edge 80 which lies beneath the connecting tabs of the tortilla. The knife edges form a vee with stop edges 82 which allows the space between the two sections of the tortilla to center and align the tortilla as it is dropped between the open molds. When the supporting rods are pushed beyond the ends of the tracks 18 and 19, the trailing rod is pushed toward the leading rod of the emerging product carrier section, causing the two hinged plates to move together. This is done with sufficient force to push the two plates and associated male and female molds together, forming the tortilla into the desired cup shape and causing the connecting tabs between the sections of the tortilla to be severed by the cutting edges 80 of the stop members 78.

As the food carrier sections 32 emerge from the cooking fat and are opened up by the tension applied to the drive chains, the fried tortilla sections form three individual taco boats. The frying at high temperature makes the tortilla dough crisp so that the taco boats hold their shapes as they are removed from the molds. The molds of each product carrier section are conveyed continuously from the output and back to the input end of the machine in an endless conveyor loop.

What is claimed is:

1. Cooking apparatus comprising:
a plurality of foldable product carrier sections, each carrier section having a leading margin and a trailing margin, the trailing margin of each section being pivotally joined to the leading margin of following adjacent carrier section to form a continuous closed loop, each carrier section being collapsible from a substantially open condition to a closed condition by moving the leading and trailing margins of each section together,
an elongated shallow vat adapted to hold hot cooking fat,
guide means directing the linked carrier sections successively in a path along the length of the vat,
means positioned adjacent one end of the vat for pushing each of the sections in succession toward the vat along the guide means, said pushing means including means for urging the trailing margin of each section toward the leading margin to close each carrier section as it is advanced toward the vat, the carrier sections advancing under the urging of the pushing means along the length of the vat in the closed condition,
each product carrier section comprising first and second frames having openings through which the hot cooking fat can flow, hinge means joining the two frames together along a pivot axis extending transverse to the direction of movement of the carrier section, a plurality of porous male mold members secured to one frame, a plurality of mating porous female mold members secured to the other frame, the male mold members moving into the female mold members when the hinged frames are moved together by said means for pushing the margins of the carrier sections together.

2. Apparatus of claim 1 wherein the plurality of male and female mold members are spaced along the frames in a direction parallel to said hinge axis.

3. Apparatus of claim 2 further including cutting members positioned between adjacent margins of the mold members, the cutting members being secured to one of said frames and having a knife edge projecting toward the other frame, the knife edge cutting any dough bridging the spaces between mold members when the frames are pushed together.

4. Apparatus of claim 3 wherein each cutting member includes a stop ledge extending substantially perpendicular to the supporting frame for engaging and positioning the dough when it is inserted between the two sets of mold members.

5. Apparatus of claim 4 wherein one frame of each carrier has slotted openings between the molds for receiving the cutting members projecting from the other frame member when the carrier section is in the closed condition.

6. Apparatus of claim 1 wherein the mold members comprise a perforated metal sheet formed into a dish shape having a flat lip projecting around the edge of the sheet, the lip of each male mold member being secured to one frame member of a carrier section and the bottom of the dish shaped portion of the female mold members being secured to the other frame member.

7. A mold for frying taco boats comprising a pair of frame members, hinge means joining the frame members, a plurality of male mold members secured in spaced side-by-side relation to one of said frame members, a plurality of mating female mold members secured to the other frame member, the mold members being formed of perforated metal having the desired shape of a taco boat, the frame members having openings covered by the perforated mold members, cutting members positioned between adjacent margins of the male and female mold members, the cutting members being secured to one of said frame members and having a knife edge projecting toward the other frame member, the knife edge cutting any dough bridging the spaces between adjacent female mold members when the frame members are pushed together.

8. Apparatus of claim 7 wherein each frame member includes hinge means adapted to pivotally connect each of the pair of frame members respectively to an adjacent pair of frame members.

9. Apparatus of claim 7 wherein each cutting member includes a stop ledge extending substantially perpendicular to the frame member to which the cutting member is secured for engaging and positioning the dough when it is inserted between the male and female mold members.

10. Apparatus of claim 9 wherein one frame member of each carrier has slotted openings between the molds for receiving the cutting members projecting from the other frame member when the carrier section is in the closed condition.

* * * * *